Patented Oct. 4, 1949

2,483,835

UNITED STATES PATENT OFFICE 2,483,835

QUICK-BREAKING EMULSIONS HAVING INCREASED ADHESION TO MINERAL AGGREGATE

Donald N. Manzer, Oakland, Calif., assignor, by mesne assignments, to Stancal Asphalt & Bitumuls Company, San Francisco, Calif., a corporation of Delaware No Drawing. Application April 26, 1946, Serial No. 665,329

6 Claims. (Cl. 106—277)

This invention relates to bituminous emulsions of the oil-in-water type; more particularly, it relates to quick-breaking emulsions containing an added material to promote adhesion of the asphalt to hydrophilic aggregate.

In the art of bituminous paving compositions, a problem of considerable and increasing importance is the phenomenon known as "stripping." When a bituminous binder is mixed with aggregate, it frequently happens that upon exposure to moisture the coating of bitumen loses its adherence to or strips from the aggregate. This is especially true in the case of certain types of aggregates known as hydrophilic aggregates, for example, Massachusetts rhyolite, Louisiana slick gravel, Olympia sand from Stockton, California, and Greenbrae aggregate from the Greenbrae quarry, Marin County, California. All of these particular aggregates are siliceous aggregates. Some non-siliceous aggregates, such as certain types of limestone, have hydrophilic tendencies.

The most advantageous means of solving the problem of stripping is the addition of a small amount of "anti-stripping" or "adhesion" agent to the bituminous binder. Many such anti-stripping or adhesion agents have been proposed and some of them are in commercial use. Most of these agents, however, are applicable only to non-aqueous binders or to water-in-oil emulsions; that is, they can be used only where the bitumen is in the continuous phase. Some of these materials, such as lead naphthenate, because they are insoluble in water, cannot be added to oil-in-water type emulsions, which are much used as binders and coating agents in the paving and allied industries. Others, such as ferric chloride, although soluble in the aqueous phase of oil-in-water emulsions, are subject to the grave disadvantage that they break or partially break the emulsion.

It is apparent that the problem of improving the adhesion or anti-stripping properties of oil-in-water type bituminous emulsions, that is to say, modifying these emulsions so that when the emulsion is mixed with aggregate and the mixture allowed to dry, a firm, stable bond between the bitumen and the aggregate results, is more difficult than the problem of improving the adhesion properties of bituminous binders in which the bitumen is present in continuous phase. Nevertheless, this problem has been very satisfactorily solved by the use of water-soluble salts of oxy-acids of chromium, more particularly, the alkali metal dichromates, such as $Na_2Cr_2O_7$ and $$K_2Cr_2O_7$$

These salts are soluble in water and, therefore, can be incorporated in the aqueous phase of oil-in-water emulsions. Moreover, their tendency to break emulsions is much less than that of salts such as the aforesaid ferric chloride. They can be incorporated in the more stable oil-in-water emulsions, that is, mixing or slow-setting emulsions and semi-mixing or medium-setting emulsions, in amount sufficient substantially to increase the adhesiveness of these emulsions to hydrophilic aggregate, without any significant tendency to break the emulsion.

This latter method, that is, the use of water-soluble salts of oxy-acids of chromium, is, however, limited in its application by the fact that these salts, and more particularly, the most effective of these salts, that is to say, the alkali metal dichromates, have a tendency to break quick-setting or quick-breaking emulsions, or at least to cause excessive shot formation.

By "quick-breaking" emulsions, as used herein, is meant emulsions which break quickly upon contact with aggregates and which undergo not less than 60% demulsification in the ASTM D401–40 Demulsibility Test, employing 35 ml. of 0.02 N calcium chloride.

It is an object of the invention to provide a means of improving the adhesiveness to aggregates and the like, of oil-in-water type emulsions of bituminous materials and other water-insoluble, water-dispersible, thermoplastic organic materials.

It is a further object of the present invention to provide a means of improving the adhesiveness to hydrophilic aggregate of quick-breaking emulsions of bituminous materials and other water-insoluble, water-dispersible, thermoplastic organic materials.

It is a further object of the present invention to improve the adhesiveness of quick-breaking bituminous emulsions without substantially impairing the stability of these emulsions.

It is a particular object of the present invention to provide a means of incorporating water-soluble salts of oxy-acids of chromium, more particularly, alkali metal dichromates, the quick-breaking asphalt emulsions in quantity sufficient substantially to improve the adhesiveness of these emulsions to hydrophilic aggregate without, however, breaking these emulsions or causing excessive shot formation.

In accordance with the procedure and in producing the products of this invention, there is incorporated in an oil-in-water type emulsion, a small amount of an alkali metal ammonium chromate; i. e., $MNH_4CrO_4$, where M is an alkali metal, such as sodium, potassium or lithium.

These chromium salts may be incorporated advantageously in any emulsion, whether quick-breaking, slow-breaking or medium-breaking, to impove adhesiveness of the dispersed material to aggregates and the like. They are, however, of greatest advantage when incorporated in a quick-breaking emulsion, since they provide improved adhesiveness without or with a minimum of undesirable effects on the emulsion, such as breakdown and shot formation.

The emulsions employed in accordance with the invention may be prepared by methods well known in the art. For example, if asphalts are available which are emulsifiable in hot, dilute, aqueous caustic alkali solution without the aid of an added emulsifying agent, they may be emulsified by the methods of Montgomerie U. S. Patent No. 1,643,675 and Braun U. S. Patent No. 1,737,491. Where such asphalts are not available, emulsions may be prepared by the use of a very small amount (e. g., 0.05 to 0.1% based on weight of emulsion) of saponifiable material such as oleic acid, Vinsol Resin or rosin oil. Emulsions so produced are quick-breaking and may be used as such, in conjunction with the above-mentioned chromium salts. Or they may be stabilized to produce slow-breaking or medium-breaking emulsions, by methods well known in the art. Slow-breaking and medium-breaking asphalt emulsions may also be prepared in a single step, by charging molten asphalt and a hot aqueous alkaline solution of emulsifying and stabilizing agents to a colloid mill.

Emulsions of other bituminous materials such as coal tar, coal tar pitch, paraffin wax, ester gum and, indeed, emulsions of any water-insoluble, water-dispersible organic material (e. g., acrylic resins, vinyl resins and alkyd resins) are susceptible to improvement by the procedure of the invention. The procedure as applied to emulsions of these non-asphaltic and non-bituminous materials, and the improved emulsions resulting therefrom, are within the broad scope of the invention.

These emulsions, however prepared, will usually contain about 55 to 65% by weight of asphalt or other dispersed material, based upon emulsion. The quantity of dispersed material may be either higher or lower, as circumstances require. The ASTM D401-40 specification for quick-setting asphalt emulsions specifies a viscosity (Saybolt furol at 77° F.) of not less than 20 nor more than 100 seconds, a residue of not less than 55 nor more than 60%, a demulsibility (35 mls. 0.02N CaCl₂) of not less than 60% and a sieve test (20 mesh) of not more than 0.1%. Ordinarily, emulsions meeting these specifications will be used. However, since specifications are subject to change from time to time and since requirements may vary from place to place, the specifications of the quick-breaking emulsion may vary in one or more respects from those of the above, preferred set of specifications.

In accordance with the invention, there is incorporated in the emulsion, as stated, a small amount of alkali metal ammonium chromate (MNH₄CrO₄, where M is an alkali metal). This salt will ordinarily be incorporated in the emulsion in the amount of 0.1 to 0.5% by weight based on emulsion, but as little as 0.05% or as much as 1% may be incorporated, and even larger amounts may, upon occasion, be required.

The chromium salt is preferably dissolved in water, e. g., to a 10% concentration, and added to the emulsion in this form, with stirring. However, the pure salt may be added to the emulsion; or the pure salt or an aqueous solution of the salt may be added to the alkaline water used for emulsification and this alkaline water, together with the asphalt or other material to be dispersed, may then be charged to suitable emulsifying apparatus.

The chromium salt may be prepared in any one of several ways. Preferably, it is prepared by dissolving alkali metal dichromate in water to, say, a 10% concentration and then adding ammonia to the resulting aqueous solution, in stoichiometric amount to complete the reaction:

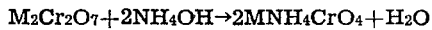

$$M_2Cr_2O_7 + 2NH_4OH \rightarrow 2MNH_4CrO_4 + H_2O$$

The ammonia may, however, be added in greater or lesser proportion than the stoichiometric amount. That is, it is not necessary (although it is preferred), just to convert the dichromate to alkali metal ammonium chromate; some unreacted dichromate or a considerable excess of ammonia may be present in the final product. The resulting aqueous solution of alkali metal ammonium chromate may then be added to the emulsion or to the alkaline water used for emulsification, as explained above.

Alternatively, ammonium dichromate

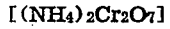

$$[(NH_4)_2Cr_2O_7]$$

may be dissolved in water and to the solution may be added caustic alkali (e. g., NaOH or KOH) in stoichiometric amount to complete the reaction:

$$(NH_4)_2Cr_2O_7 + 2MOH \rightarrow 2MNH_4CrO_4 + H_2O$$

The resulting aqueous solution may then be added to the emulsion or to the alkaline water used for emulsification.

Or if alkali metal ammonium chromate

$$(MNH_4CrO_4)$$

is available as such, it may be added as such or in aqueous solution to the emulsion or to the alkaline water used for emulsification, thus avoiding treatment of dichromate with ammonia or caustic alkali. Thus, sodium ammonium chromate dihydrate (NaNH₄CrO₄·2H₂O) is obtainable as such by the method described in Mellor's "Treatise on Inorganic and Theoretical Chemistry," vol. XI, page 249, Longmans, Green & Co., 1931. The salt so prepared can be readily dissolved in water and added to the emulsion or to the alkaline water used for emulsification.

As stated, the alkali metal ammonium chromates do not exert an undesirable effect on quick-breaking emulsions, or do not exert as undesirable effects as the alkali metal dichromates. It may happen, nevertheless, that if one of these salts is added to a quick-breaking emulsion of very high demulsibility, it will cause undesirable shot or skin formation. Should this occur, the defect may be remedied by first adding to the emulsion a small amount of stabilizer, e. g., 0.05 to 0.1% of Vinsol Resin based on weight of emulsion. Vinsol Resin is the trade-name of a product of the Hercules Powder Company, being a solvent extracted, petroleum hydrocarbon insoluble pinewood resin which is further identified in Buckley, U. S. Patent No. 2,256,886.

The improvement in adhesion effected by addition to emulsions of the ammonium-chromium salts of the invention, undergoes some deterioration as the emulsion ages. Hence, it is preferred to use the emulsion before it has aged very long. However, this deterioration takes place sufficiently slowly that emulsion can be stored for a considerable period of time and still pass stringent adhesion tests.

The following specific examples will serve to illustrate the practice and advantages of the invention.

Example 1

A quick-breaking emulsion was prepared by emulsifying 56 parts by weight of hot, molten 180–200 penetration California asphalt refined from San Joaquin Valley crude petroleum, in 44 parts by weight of hot 0.32% aqueous NaOH solution. A 10% aqueous sodium dichromate solution was prepared and separated into five portions. To each portion of dichromate solution was added ammonia (in the form of a 29% aqueous solution), in differing amounts. Each of the thus treated dichromate solutions was then added to a separate portion of the above-described emulsion. The emulsions so treated and a portion of untreated emulsion were then submitted to tests, with results as follows:

Table I

| Emulsion | A | B | C | D | E | F |
|---|---|---|---|---|---|---|
| Chromium salt (percent by wt. based on emulsion, reckoned as $Na_2Cr_2O_7$) | nil | 0.352 | 0.352 | 0.352 | 0.352 | 0.352 |
| Molar ratio of $NH_3$ to chromium salt, reckoned as $Na_2Cr_2O_7$ | | 2.28 | 2.50 | 3.07 | 3.54 | 4.56 |
| Residue | 55.4 | 54.4 | 54.6 | 54.8 | 54.8 | 54.6 |
| Demulsibility (0.02N $CaCl_2$) | 100 | 100 | 100 | 98.5 | 98.5 | 98.5 |
| Screen, 20 mesh | trace | 0.84 | 1.61 | 0.64 | 0.45 | 0.18 |
| pH | 12.0 | 10.9 | 10.1 | 10.1 | 10.0 | 10.1 |
| Adhesion | 5 | 90 | 90 | 90 | 90 | 90 |

The residue, demulsibility and screen tests of Table I above were the same as those of ASTM D401–40 test referred to hereinabove. pH measurements were made with a Beckman pH meter (glass electrode type).

The adhesion test was carried out as follows: 200 grams of dry Standard Massachusetts rhyolite (obtained from the Central Scientific Company, Cambridge, Massachusetts), graded so as to pass entirely through a ¼-inch (No. 3) sieve and to be retained completely on a No. 10 sieve, were taken. This aggregate was heated to 300° F. and mixed with 16 grams of emulsion until complete coating resulted. Three 50 gram samples of the coated aggregate were then taken and each was spread thinly on a metal can lid and left in an oven for 48 hours at 140° F. Each cured sample was then dropped into 400 cc. of boiling distilled water in a 600 cc. beaker and stirred 3 minutes at the rate of 60 times a minute, boiling meanwhile being continued. Each beaker was then removed from the heat and, after ebullition had ceased, cold water was run into the beaker through a submerged hose until any film of asphalt on the surface of the water was flushed out. Each sample of aggregate was then removed and placed on absorbent paper and air dried. The dried samples were then inspected visually by an experienced observer to estimate the percentage area coated, uncoated area being deemed that retaining no asphaltic coating. The figures for the three samples were then averaged.

It will be noted that the adhesion was in every case greatly improved. Moreover, the demulsibility was not appreciably affected. In no case was the emulsion broken. A small amount of shot formation did occur, but by screening the emulsion through a 20 mesh screen, this could be removed.

By way of comparison, upon adding to the same quick-breaking emulsion 0.35% of sodium dichromate in the absence of ammonia, the emulsion would be broken to a considerable degree.

Example 2

A quick-breaking asphalt emulsion containing about 62% by weight of asphalt emulsified in 39 parts by weight of dilute aqueous caustic soda solution, was taken. To a portion of this emulsion was added 0.05% by weight based on emulsion of saponified Vinsol Resin.

A 10% aqueous sodium dichromate solution was prepared and aqueous ammonia (26° Bé.) was added to the dichromate solution in the amount of 26% based on weight of $Na_2Cr_2O_7$. This solution was then added to a portion of the above-described emulsion containing saponified Vinsol Resin, in such amount as to incorporate in the emulsion 0.3% of chromium salt (reckoned as $Na_2Cr_2O_7$), based on weight of emulsion.

The untreated emulsion, the emulsion treated with saponified Vinsol Resin and the emulsion treated with both the resin and the chromium salt were then submitted to tests, with results, as follows:

Table II

| | Untreated Emulsion | Emulsion Treated with Vinsol Resin | Emulsion [1] |
|---|---|---|---|
| Viscosity | 845 | 100 | 58.4 |
| Screen, 20 mesh | 0.020 | 0.025 | 0.015 |
| Demulsibility 0.02 N $CaCl_2$ | 99.1 | 98.8 | 96.6 |
| pH | 11.9 | 11.9 | 10.6 |
| percent Adhesion | 5 | 5 | 75 |
| Settlement, 5 days | 0.6 | 0.2 | 1.0 |

[1] Treated with Vinsol Resin and Chromium-Ammonium Salt.

In no case was excessive shot formation observed. Again, a hydrophilic aggregate was used in the adhesion test.

Example 3

Ammonium potassium chromate was prepared according to the procedure of Mellor, op. cit., vol. XI, page 249, as follows: A hot solution of 1 part by weight of $K_2Cr_2O_7$ in 1 part by weight of water was added to 1 part by weight of cold aqueous ammonia (28% $NH_3$) and the resulting solution was cooled to 35° F. Alcohol in the amount of about one quarter the volume of the above aqueous solution was added to the solution, whereupon a precipitate was formed. This precipitate was filtered and washed with water and then dried by pressing between dry filter paper and, finally, for 72 hours in a desiccator at room temperature. The product was ammonium potassium chromate $[(NH_4)KCrO_4]$. A 10% solution in distilled water was prepared and found to have a pH of 7.4.

To 95.6 parts by weight of a quick-breaking asphalt emulsion substantially the same as that of Example 1 above (demulsibility, 35 mls. 0.02N $CaCl_2=100$), were added 4.4 parts of this aqueous solution of ammonium potassium chromate. Only a very slight breaking effect was produced by the added salt solution, as indicated by a screen test of 0.125%. Even this slight effect can be dissipated by first adding to the emulsion, before the chromate is added, about 0.05 to 0.1% of saponified Vinsol Resin to reduce the demulsibility somewhat. Adhesion of the emulsion containing the chromate, as measured on Massachusetts rhyolite, using the adhesion test described hereinabove, was 90 to 100%.

By way of examples of application of the present invention to slow-breaking emulsions, a 10% aqueous sodium dichromate solution treated with ammonia in the amount of 2 mols of $NH_3$ per mol of $Na_2Cr_2O_7$ may be added to any of the following slow-breaking emulsions, in such amount as to incorporate 0.1 to 0.5% of chromium salt (reckoned as $Na_2Cr_2O_7$) based on the weight of emulsion.

*Example 4*

| | Per cent |
|---|---|
| Quick-breaking asphalt emulsion of Example 1 | 98.5 |
| Saponified Vinsol Resin | 1.5 |

*Example 5*

| | Per cent |
|---|---|
| Asphalt | 55 |
| Aqueous alkaline solution | 45 |
| Water | 43.85 |
| NaOH | 0.15 |
| Water-soluble blood solids | 1.0 |

In making this last emulsion, the asphalt in hot, molten form and the hot aqueous solution may be charged in the proportions indicated to a colloid mill to produce the desired emulsion.

I claim:

1. A quick-breaking oil-in-water type emulsion consisting essentially of water, a water-insoluble, water-dispersible, organic, thermoplastic, resinous substance emulsified therein, and a small amount of a preformed alkali metal ammonium chromate salt sufficient substantially to promote adhesion of the emulsified substance to hydrophilic aggregate.

2. The emulsion of claim 1, wherein the water-insoluble, water-dispersible thermoplastic substance is asphalt.

3. The emulsion of claim 1, wherein the alkali metal ammonium chromate is incorporated as an aqueous solution.

4. The emulsion of claim 1, wherein the alkali metal ammonium chromate is present in an amount equal to about 0.05 to 1.0 per cent based on the weight of the emulsion.

5. The emulsion of claim 1, wherein the alkali metal ammonium chromate is sodium ammonium chromate.

6. The emulsion of claim 1, wherein the alkali metal ammonium chromate is potassium ammonium chromate.

DONALD N. MANZER.

REFERENCES CITED

The following references are of record in the file of this patent:

UNITED STATES PATENTS

| Number | Name | Date |
|---|---|---|
| 2,256,886 | Buckley | Sept. 23, 1941 |
| 2,330,100 | Williams | Sept. 21, 1943 |
| 2,412,526 | McCoy | Dec. 10, 1946 |
| 2,412,545 | Watts | Dec. 10, 1946 |

FOREIGN PATENTS

| Number | Country | Date |
|---|---|---|
| 341,443 | Great Britain | Jan. 9, 1931 |
| 465,589 | Great Britain | May 10, 1937 |
| 538,105 | Great Britain | July 21, 1941 |